UNITED STATES PATENT OFFICE.

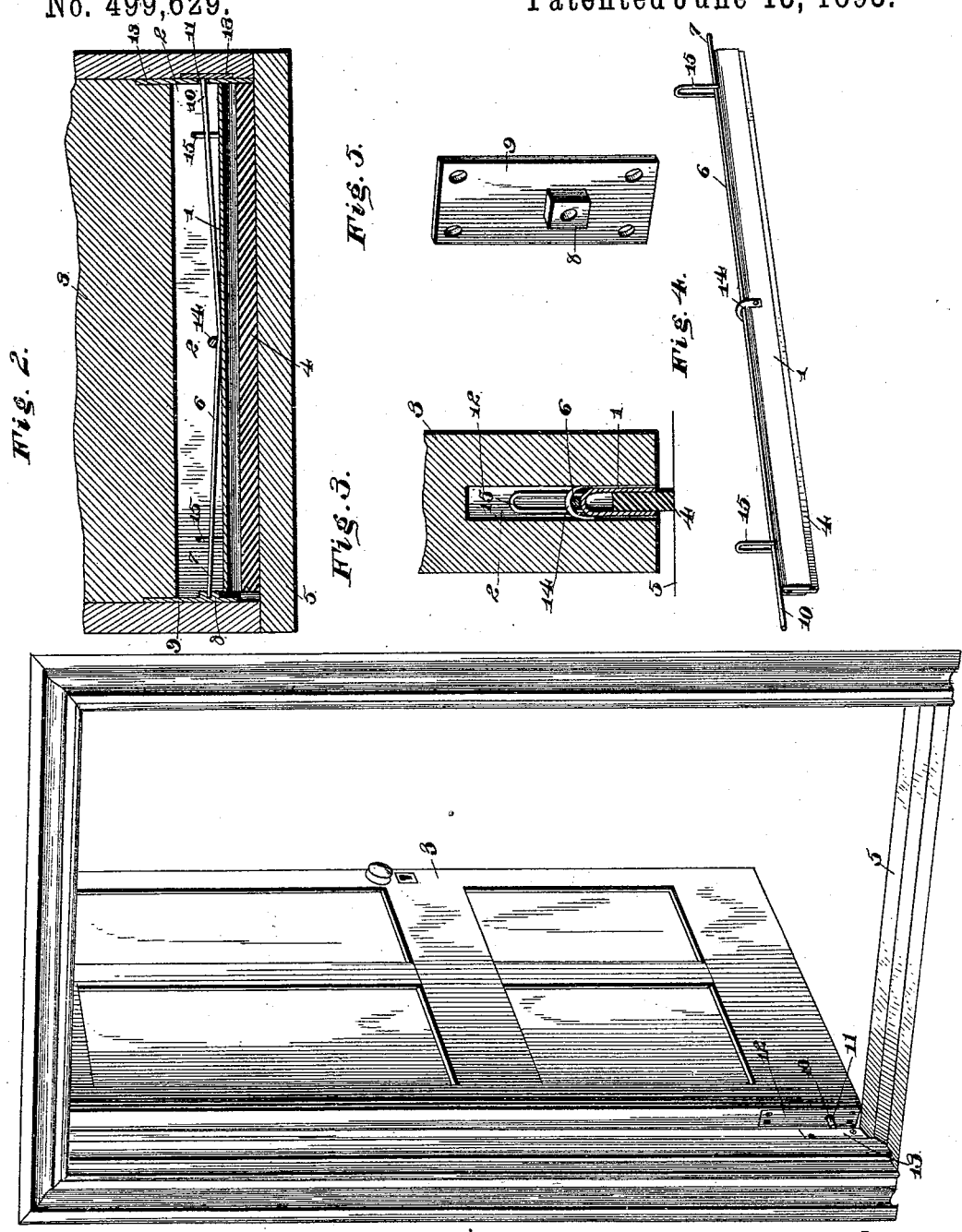

ELIAS C. ELLIS, OF COLORADO SPRINGS, COLORADO.

WEATHER-STRIP.

SPECIFICATION forming part of Letters Patent No. 499,629, dated June 13, 1893.

Application filed May 18, 1892. Serial No. 433,435. (No model.)

*To all whom it may concern:*

Be it known that I, ELIAS C. ELLIS, a citizen of the United States, residing at Colorado Springs, in the county of El Paso and State of Colorado, have invented a new and useful Weather-Strip, of which the following is a specification.

The invention relates to improvements in weather strips.

The object of the present invention is to provide a simple and inexpensive weather strip, which may be readily applied to a door, and which when the door is closed will lie flat against a door sill, to exclude wind, rain and the like, and which when the door is open will be held up above the carpet.

The invention consists in the construction and novel combination and arrangement of parts hereinafter fully described, illustrated in the accompanying drawings and pointed out in the claim hereto appended.

In the drawings—Figure 1 is a perspective view of a portion of a door and door frame provided with a weather strip constructed in accordance with this invention, the door being partially open. Fig. 2 is a vertical sectional view, the door being closed. Fig. 3 is a transverse sectional view. Fig. 4 is a detail perspective view of the weather strip and spring removed. Fig. 5 is a detail perspective view of one of the end plates.

Like numerals of reference indicate corresponding parts in all the figures of the drawings.

1 designates a weather strip arranged in a groove 2 at the bottom of a door 3, and provided at its lower edge with a strip 4 of rubber or similar material adapted when the door is closed to be forced down against a door sill 5, and when the door is opened to be raised up from the sill and held out of contact with the floor or carpet. The weather strip is constructed of sheet metal which is folded longitudinally, and which has the strip of rubber secured within it between its sides. Arranged on the upper edge of the weather strip and extending longitudinally of it, is a spring rod 6, which is centrally secured to the weather strip at the center thereof, and which projects beyond the ends of the weather strip, and has its end 7 arranged in a socket 8 of an end plate 9 and its other end 10 projecting through an opening 11 of an end plate 12 and adapted when the door is closed to come in contact with the frame of the door, whereby the spring-rod is bowed downward, forcing the weather strip downward and carrying the strip of rubber in contact with the door sill. The end 7 of the spring is arranged at the free edge of the door, and the socket 8 is constructed in a lug formed integral with the end plate 9 and arranged on the inner face of the same. The end plates are arranged in recesses in the side edges of the door, and have their outer faces flush with the side edges of the door. The end 10 of the spring rod comes in contact with a rectangular plate 13 secured to the door frame to prevent injury to the latter. The spring is secured at its center by means of a loop 14 and it is guided near its ends by vertical loops 15 rising from the upper edge of the weather strip. By this construction the groove in the bottom of the door may be made with an ordinary grooving tool, and the precision required in constructing a groove where the sides of the latter are relied on to operate as guides, is unnecessary owing to the guiding loops. The resilient rod may be readily attached to any form of weather strip and does not necessitate a flat surface, as would be the case were a flat spring employed. It will be seen that the weather strip is simple and comparatively inexpensive in construction, that it is adapted to be readily applied to a door, and is capable of effectually excluding wind, rain, dust and the like.

What I claim is—

The combination with a door provided at its bottom with a vertical groove, the end plates 9 and 12 secured to the side edges of the door at the ends of the grooves, the plate 9 having a socket and the plate 12 being provided with an opening, a weather strip constructed of sheet metal bent longitudinally and having an elastic strip secured between its sides, vertical loops secured to the weather strip near the ends thereof and being approximately inverted U-shape, and a resilient rod secured at its center to the upper edge of the weather strip at the center thereof and projecting from each end of the weather strip and having one end arranged in the socket of the plate 9 and its other end extending through the opening of the other plate, substantially as described.

In testimony that I claim the foregoing as my own I have hereto affixed my signature in the presence of two witnesses.

ELIAS C. ELLIS.

Witnesses:
I. M. GOSHEN,
R. L. KELLEY.